(12) United States Patent
Klein et al.

(10) Patent No.: US 10,690,354 B2
(45) Date of Patent: Jun. 23, 2020

(54) EXHAUST GAS PURIFYING SYSTEM

(71) Applicants: Mark Klein, San Clemente, CA (US); David Kelly, Lake Elsinore, CA (US)

(72) Inventors: Mark Klein, San Clemente, CA (US); David Kelly, Lake Elsinore, CA (US)

( * ) Notice: Subject to any disclaimer, the term of this patent is extended or adjusted under 35 U.S.C. 154(b) by 11 days.

(21) Appl. No.: 15/901,485

(22) Filed: Feb. 21, 2018

(65) Prior Publication Data
US 2019/0257528 A1 Aug. 22, 2019

(51) Int. Cl.
| | | |
|---|---|---|
| F24C 15/20 | (2006.01) | |
| B01D 46/00 | (2006.01) | |
| B01D 39/20 | (2006.01) | |
| B01D 53/86 | (2006.01) | |
| B01D 46/10 | (2006.01) | |

(52) U.S. Cl.
CPC ...... *F24C 15/2035* (2013.01); *B01D 39/2051* (2013.01); *B01D 46/0056* (2013.01); *B01D 46/0063* (2013.01); *B01D 46/10* (2013.01); *B01D 53/86* (2013.01); *F24C 15/205* (2013.01); *B01D 2275/20* (2013.01); *B01D 2279/35* (2013.01)

(58) Field of Classification Search
None
See application file for complete search history.

(56) References Cited

U.S. PATENT DOCUMENTS

| | | | |
|---|---|---|---|
| 4,138,220 A | 2/1979 | Davies et al. | |
| 4,235,220 A | 11/1980 | Hepner | |
| 4,415,342 A * | 11/1983 | Foss | B01D 46/10 |
| | | | 423/245.1 |
| 5,038,747 A | 8/1991 | Tsuchiya et al. | |
| 5,580,535 A | 12/1996 | Hoke et al. | |
| 5,622,100 A | 4/1997 | King et al. | |
| 7,000,527 B2 | 2/2006 | Payen | |
| 7,308,852 B2 | 12/2007 | Kaminaka et al. | |
| 7,445,757 B2 | 11/2008 | Autin et al. | |
| 7,588,025 B2 | 9/2009 | Raus et al. | |
| 8,418,684 B2 | 4/2013 | Robinson, Jr. | |
| 8,847,119 B2 | 9/2014 | Hildner et al. | |
| 9,157,639 B2 | 10/2015 | Gallici et al. | |

* cited by examiner

*Primary Examiner* — Anita Nassiri-Motlagh
(74) *Attorney, Agent, or Firm* — Taylor IP, P.C.

(57) ABSTRACT

A restaurant exhaust gas purifying system for filtering an exhaust gas of a cooking process including an exhaust vent and an exhaust gas purifier coupled to the exhaust vent. The exhaust gas purifier includes a housing which has an inlet connected to the exhaust vent and an outlet, a hot box connected to and housed within the housing, a heating device connected to the housing and configured for heating the hot box, and a rotating filter rotatably mounted to and housed within the housing. The rotating filter has a rotational cycle in which at least a portion of the rotating filter passes through the hot box. The exhaust gas purifier also includes a drive connected to the housing and operably coupled to the rotating filter for rotating the rotating filter, and a stationary filter positioned in the hot box.

18 Claims, 10 Drawing Sheets

EXHAUST GAS PURIFYING SYSTEM

BACKGROUND OF THE INVENTION

1. Field of the Invention

The present invention relates to exhaust gas purification devices, and, more particularly to exhaust gas purification devices for removing pollutants in cooking fumes.

2. Description of the Related Art

An exhaust gas treatment device may be used to clean an exhaust airstream of a cooking process, such as the cooking of meats via an industrial gas grill in a restaurant. Some restaurants can emit undesired exhaust airstreams that contain pollutants, such as greases, oils, and/or organic materials from the cooking process. The exhaust gas may produce smoke or release an unpleasant smell into the atmosphere. The treatment device filters the exhaust gas before it discharges into the ambient atmosphere.

Generally, treatment devices include a filter that removes grease and organic materials, such as hydrocarbons from the exhaust gas. Some exhaust gas treatment devices may additionally include an incineration process in order to incinerate organic materials using an open flame. Yet, such an incineration process generally necessitates a significant amount of energy to maintain the high temperature of the open flame. Alternatively, some treatment devices may include a catalytic process which catalytically oxidizes the pollutants in the exhaust air stream. For example, U.S. Pat. No. 4,138,220, issued to Davies et al., discloses an apparatus for catalytically oxidizing pollutants by heating the airstream to a temperature at which passage over a catalytic filter causes flameless oxidation of the organic material in the airstream. The organic material is then converted to carbon dioxide and water. The catalytic filter may have a honeycomb structure with a platinum-containing catalyst material coated thereon. However, once the pollutants have been captured by the filtration process, the filter may become clogged and it may be difficult to remove the pollutants from the filter.

What is needed in the art is a cost-effective and easy-to-maintain exhaust gas purification system.

SUMMARY OF THE INVENTION

The present invention provides an exhaust gas purifier which generally includes a housing, a rotating filter within the housing, a drive, a hot box, a heating device for heating the hot box, and a stationary filter within the hot box. The exhaust gas purifier is self-cleaning and filters out pollutants, including various particulates and organic materials, from the exhaust gas of a cooking process.

The invention in one form is directed to a restaurant exhaust gas purifying system for filtering an exhaust gas of a cooking process including an exhaust vent and an exhaust gas purifier coupled to the exhaust vent. The exhaust gas purifier includes a housing which has an inlet connected to the exhaust vent and an outlet, a hot box connected to and housed within the housing, a heating device connected to the housing and configured for heating the hot box, and a rotating filter rotatably mounted to and housed within the housing. The rotating filter has a rotational cycle in which at least a portion of the rotating filter passes through the hot box. The exhaust gas purifier also includes a drive connected to the housing and operably coupled to the rotating filter for rotating the rotating filter, and a stationary filter positioned in the hot box.

The invention in another form is directed to an exhaust gas purifier for filtering out an exhaust gas. The exhaust gas purifier includes a housing having an inlet and an outlet, a hot box connected to and housed within the housing, a heating device connected to the housing and configured for heating the hot box, and a rotating filter rotatably mounted to and housed within the housing. The rotating filter has a rotational cycle in which at least a portion of the rotating filter passes through the hot box. The exhaust gas purifier also includes a drive connected to the housing and operably coupled to the rotating filter for rotating the rotating filter, and a stationary filter positioned in the hot box.

The invention in yet another form is directed to a method for cleaning an exhaust gas of a cooking process. The method includes the steps of providing an exhaust gas purifier which includes a housing that has an inlet and an outlet, and a hot box connected to and housed within the housing. The hot box includes a first chamber and a second chamber positioned above the first chamber. The exhaust gas purifier also includes a heating device connected to the housing and configured for heating the hot box, a rotating filter rotatably mounted to and housed within the housing and having a rotational cycle in which at least a portion of the rotating filter passes through the hot box, a drive connected to the housing and operably coupled to the rotating filter for rotating the rotating filter, and a stationary filter positioned in the second chamber of the hot box. The method also includes the steps of rotating said rotating filter by the drive, capturing a plurality of pollutants out of the exhaust gas by said rotating filter, self-cleaning said portion of said rotating filter by heating the first chamber by way of the heating device such that said plurality of pollutants are removed from said rotating filter, heating the second chamber of the hot box by the heating device, and catalytically cleaning an airstream traveling through the second chamber by the stationary filter.

An advantage of the present invention is that the exhaust fumes are efficiently filtered by the exhaust gas purifier.

Another advantage is that the exhaust gas purifier is easy to maintain because the exhaust gas purifier includes a hot box that self-cleans the filter which captures various particulates and organic materials from the exhaust gas of the cooking process.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
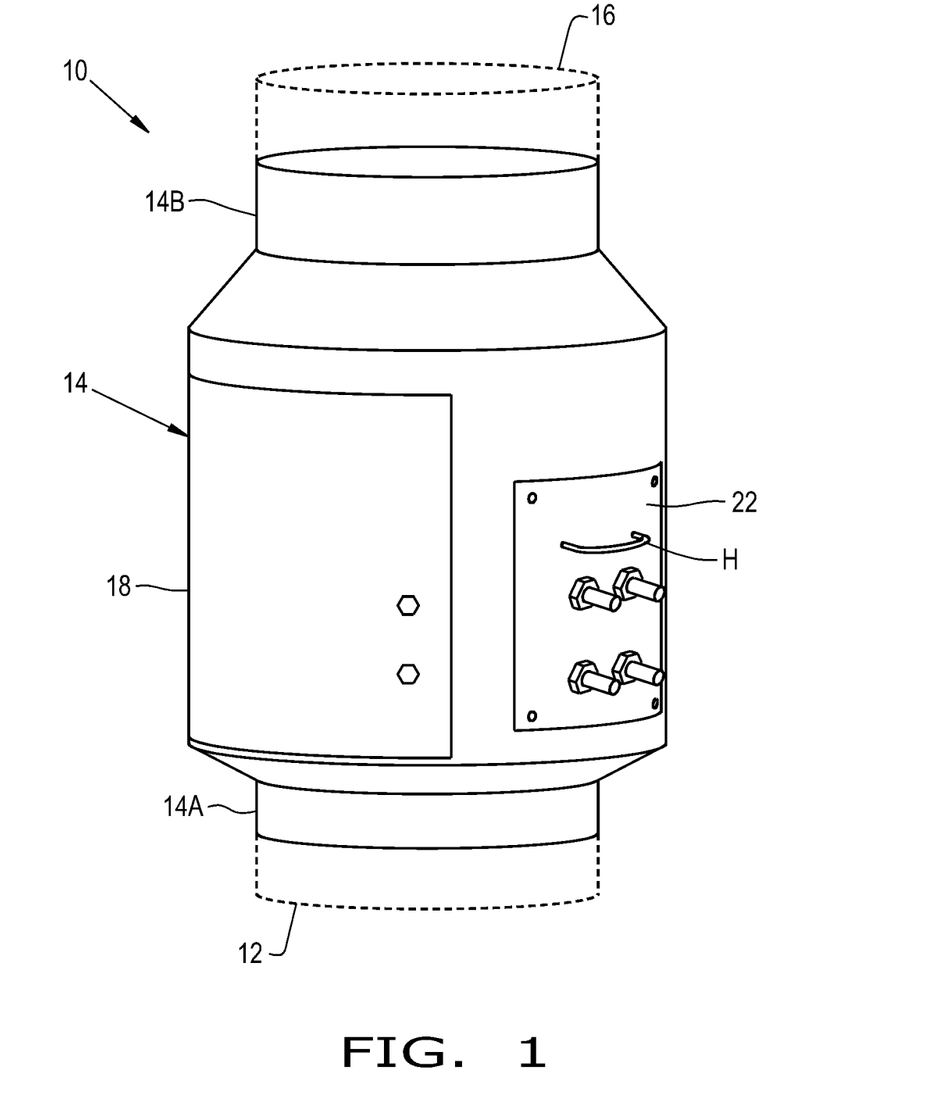
FIG. 1 is a perspective view of an embodiment of the exhaust gas purifying system according to the present invention.

Referring now to the drawings, and more particularly to FIG. 1, there is shown an exhaust gas purifying system 10 for filtering an airstream, such as an exhaust gas of a cooking process. For example, the exhaust gas purifying system 10 may be in the form of a restaurant exhaust gas purifying system 10 which may purify the exhaust gas of a gas under-fired cooking process. The exhaust gas purifying system 10 may clean a percentage of pollutants, such as organic compound material and particulate matter, from the exhaust gas. The restaurant exhaust gas purifying system 10 generally includes an exhaust vent 12, for example an exhaust vent 12 of a gas under-fired grill, an exhaust gas purifier 14 coupled to the exhaust vent 12, and a power vent 16 connected to the exhaust gas purifier 14. It should be appreciated that the cooking process may include cooking food, e.g. meat, over a gas under-fired grill.

The exhaust vent 12 may be in the form of any desired exhaust vent 12 such as an exhaust duct extending outwardly from the roof of a restaurant. It is conceivable that the exhaust vent 12 may not be an exhaust vent of a restaurant, such as an exhaust vent of a non-commercial grill. The power vent 16 may be in the form of any desired power vent which is capable of forcibly drawing air through the exhaust gas purifier 14.

Referring now collectively to FIGS. 1-6, there is shown the exhaust gas purifier 14. The bottom end 14A of the exhaust gas purifier 14 is connected to the exhaust vent 12 and the top end 14B is connected to the power vent 16. The exhaust gas purifier 14 generally includes a housing 18, a hot box 20, a heating device 22, a rotating filter 24, a drive 26 for driving the rotating filter 24 (FIG. 9A), and a stationary filter 28.

Figure 3:
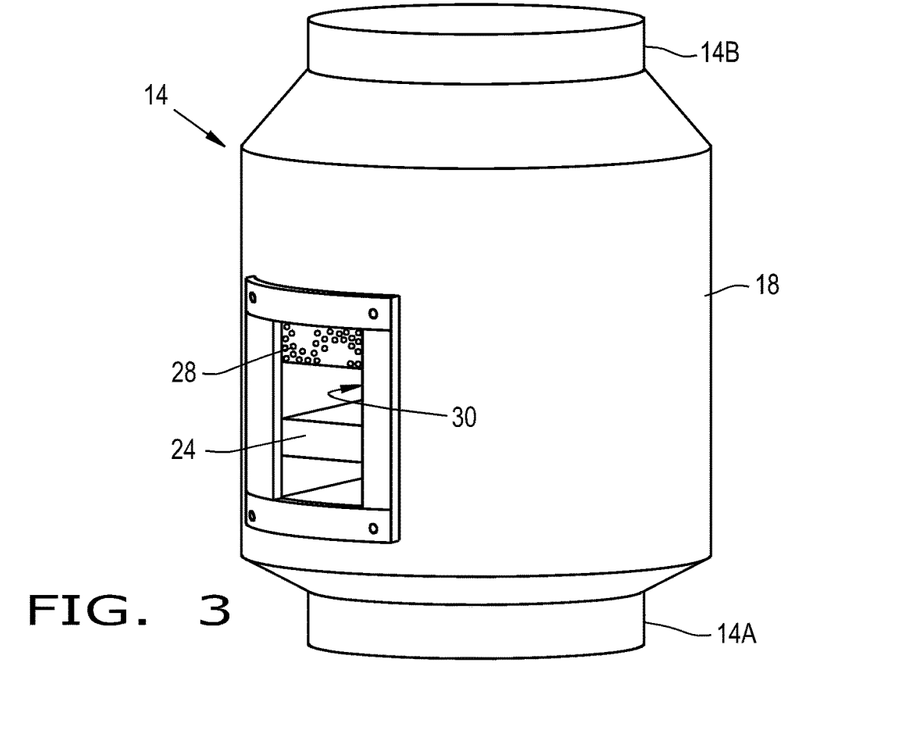
FIG. 3 is a side perspective view of the exhaust gas purifying system with the heating device removed.

The housing 18 has an inlet 18A (FIG. 6) and an outlet 18B (FIGS. 4-5) respectively connected to the exhaust vent 12 and the power vent 16. As shown, the housing 18 is cylindrical and defines an interior space therein for the exhaust gas to flow therethrough. The housing 18 may have one or more cutouts for accommodating various components of the exhaust gas purifier 14. For instance, the housing 18 may have a rectangular cutout 30 for fitting the heating device 22 (FIG. 3). Additionally, for example, the housing 18 may also have a cutout 32 for accommodating the drive 26 (FIG. 9B). The housing 18 may be composed of any suitable material, such as stainless steel.

Figure 5:
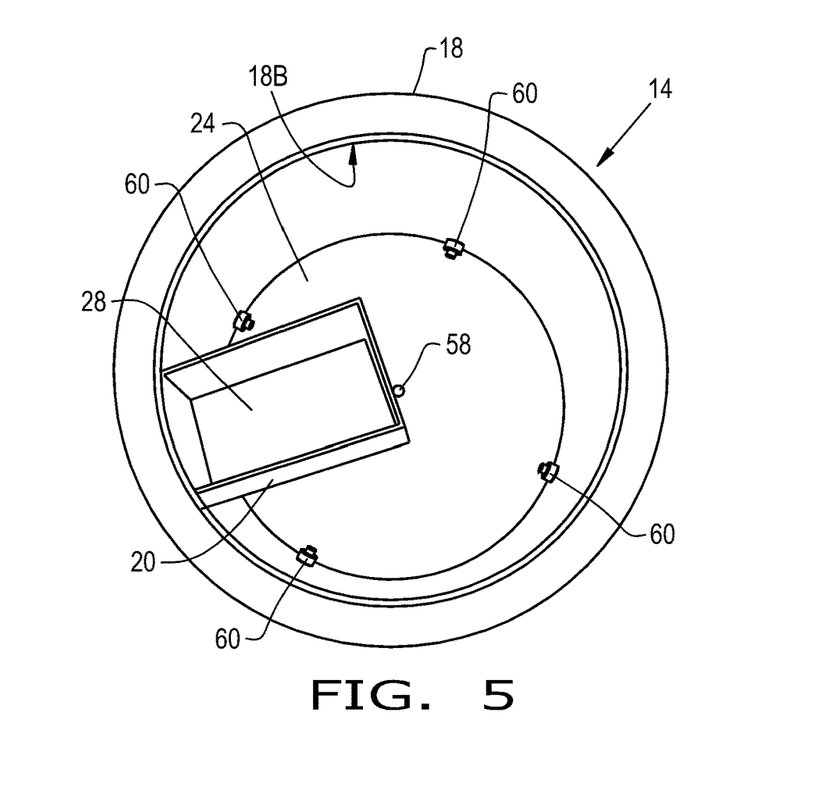
FIG. 5 is another top perspective view of the exhaust gas purifying system.
Figure 6:
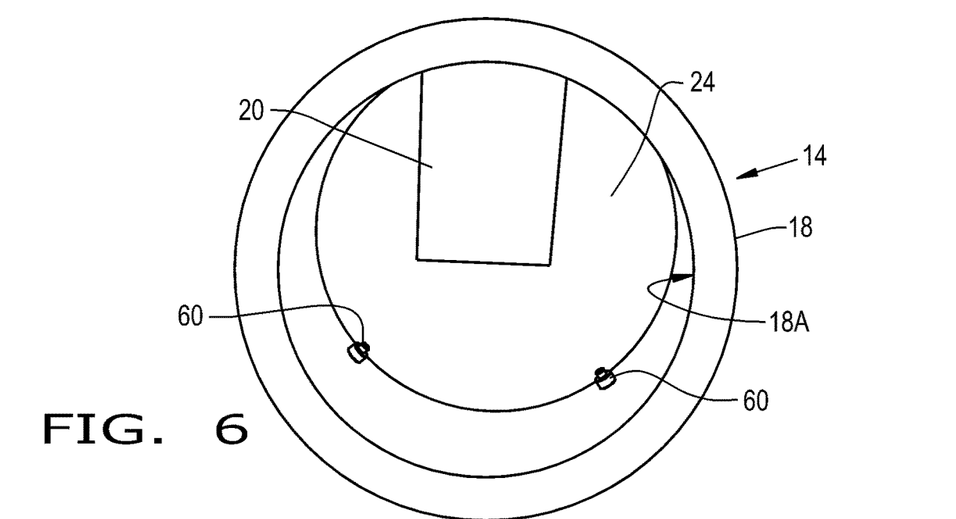
FIG. 6 is a bottom perspective view of the exhaust gas purifying system.
Figure 7:
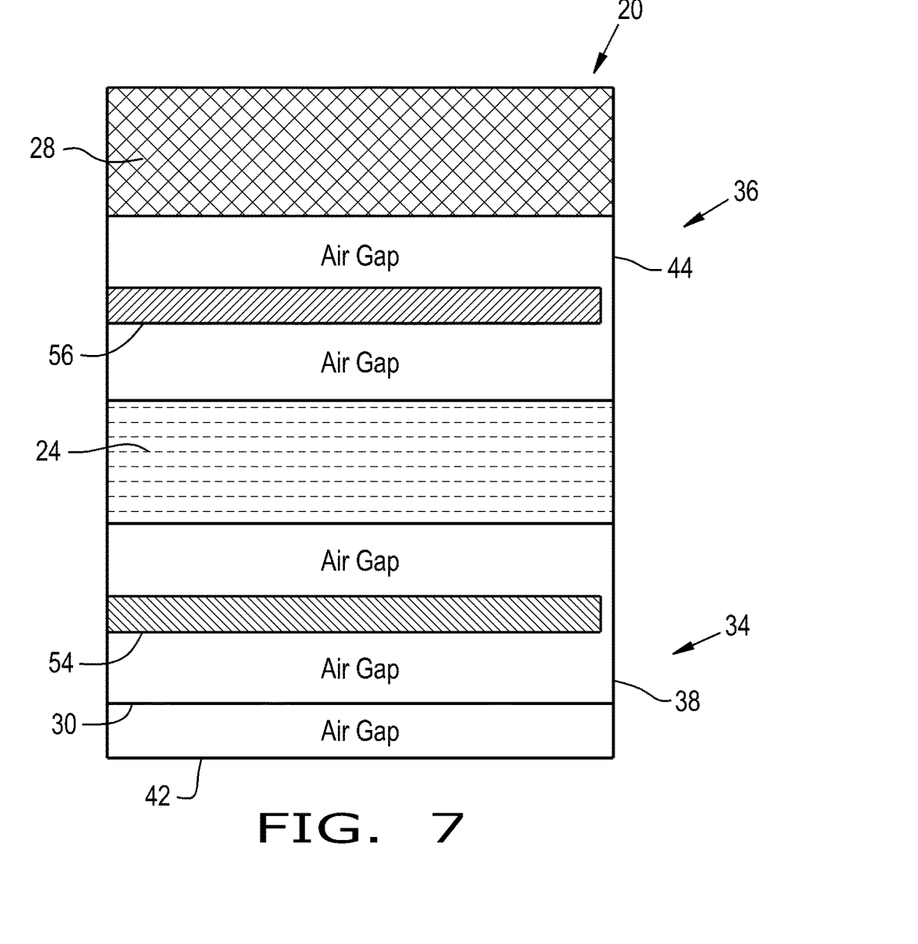
FIG. 7 is a schematic representation of the hot box of the exhaust gas purifying system.

Referring now collectively to FIGS. 4-6, 7, and 8A-8E, the hot box 20 is connected to and housed within the housing 18. More specifically, the hot box 20 is attached to the inner side wall of the housing 18. The hot box 20 may have a substantially rectangular shape and may extend lengthwise along the longitudinal axis of the housing 18. The hot box 20 may include a first chamber 34, e.g. a lower hot box (FIGS. 8A-8B), and a second chamber 36, e.g. an upper hot box (FIGS. 8C-8E), which is positioned above the first chamber 34. The first and second chambers 34, 36 may be separated by the rotating filter 24, which is positioned in between the first and second chambers 34, 36 (FIG. 7). The hot box 20 may be composed of any suitable material such as stainless steel.

Figure 8A:
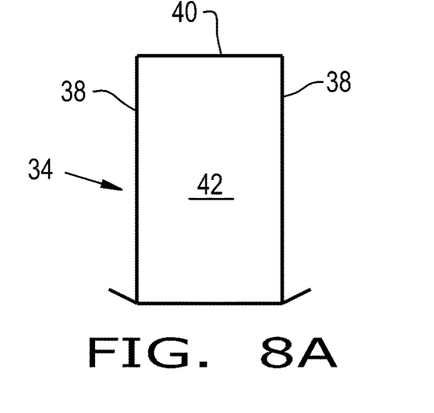
FIGS. 8A-8E illustrate the lower and upper chambers of the hot box.
Figure 8B:
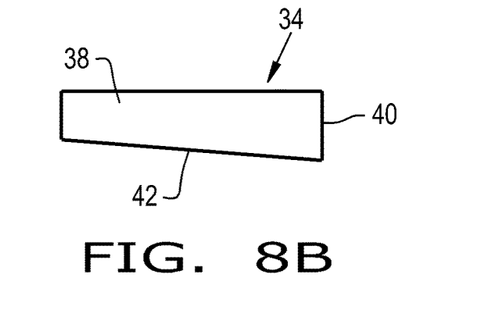

The first chamber 34 is configured for heating and self-cleaning the portion of the rotating filter 24 which passes in between the first and second chambers 34, 36. The first chamber 34 is composed of a pair of side walls 38, a rear wall 40, and a bottom wall 42. The rotating filter 24 covers and defines the top of the first chamber 34. The front portions of the side walls 38 may be bent to follow the radius of the housing 18 (FIG. 8A) and the bottom wall 42 may be slanted to allow the accumulation of particulate material falling from the rotating filter 24 (FIG. 8B). The front portions of the side walls 38 may be attached to the inside wall of the housing 18 by way of fasteners and/or welding.

Figure 4:
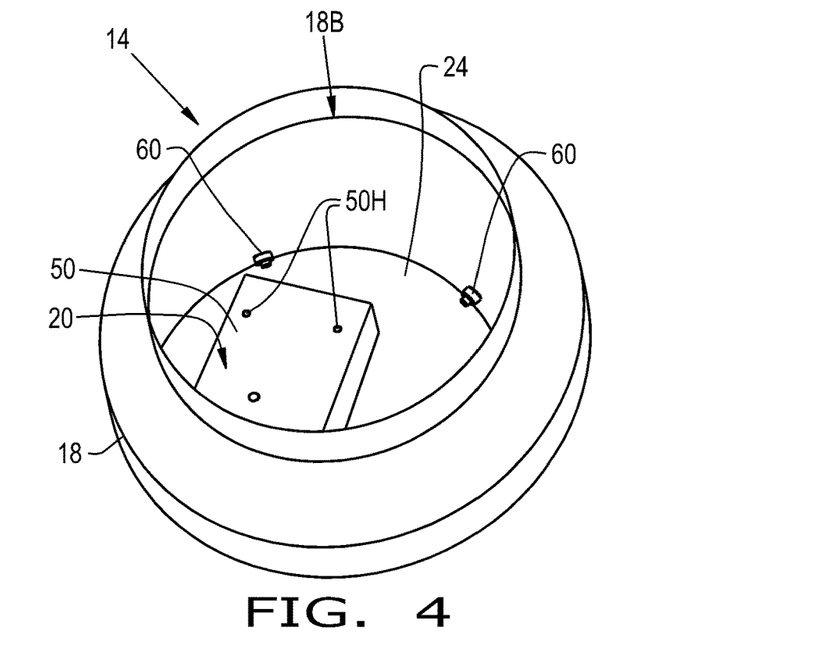
FIG. 4 is a top perspective view of the exhaust gas purifying system.
Figure 8C:
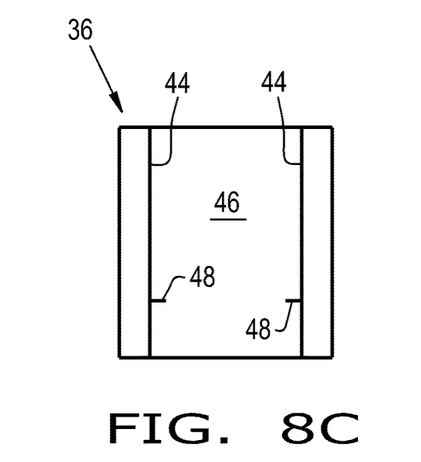
Figure 8D:
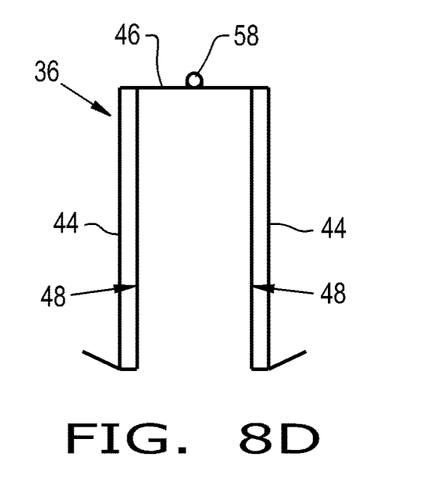
Figure 8E:
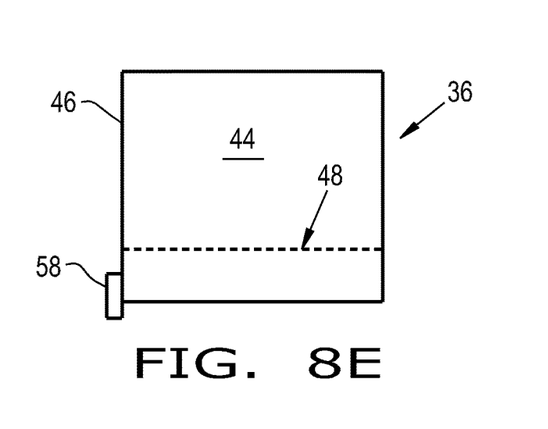

The second chamber 36 is configured for housing and heating the stationary filter 28. The second chamber 36 is composed of a pair of side walls 44, a rear wall 46, and a pair of ledges 48 attached to the side walls 44 and extending inwardly therefrom (FIGS. 8C-8E). The rotating filter 24 covers and defines the bottom of the second chamber 36. The top of the second chamber 36 may be open, or the top of the second chamber 36 may be covered by a top cover 50 (FIG. 4). The top cover 50 captures heat in the second chamber 36, and the top cover may have one or more holes 50H for allowing the exhaust gas to escape therethrough. The front portions of the side walls 44 may be bent to follow the curvature of the housing 18 and they may be attached to the inside wall of the housing 18 by way of fasteners and/or welding (FIG. 8D). The ledges 48 support the stationary filter 28 such that the stationary filter 28 may be removably slid into the second chamber 36 and rest on top of the ledges 48 (FIG. 8C).

Figure 2:
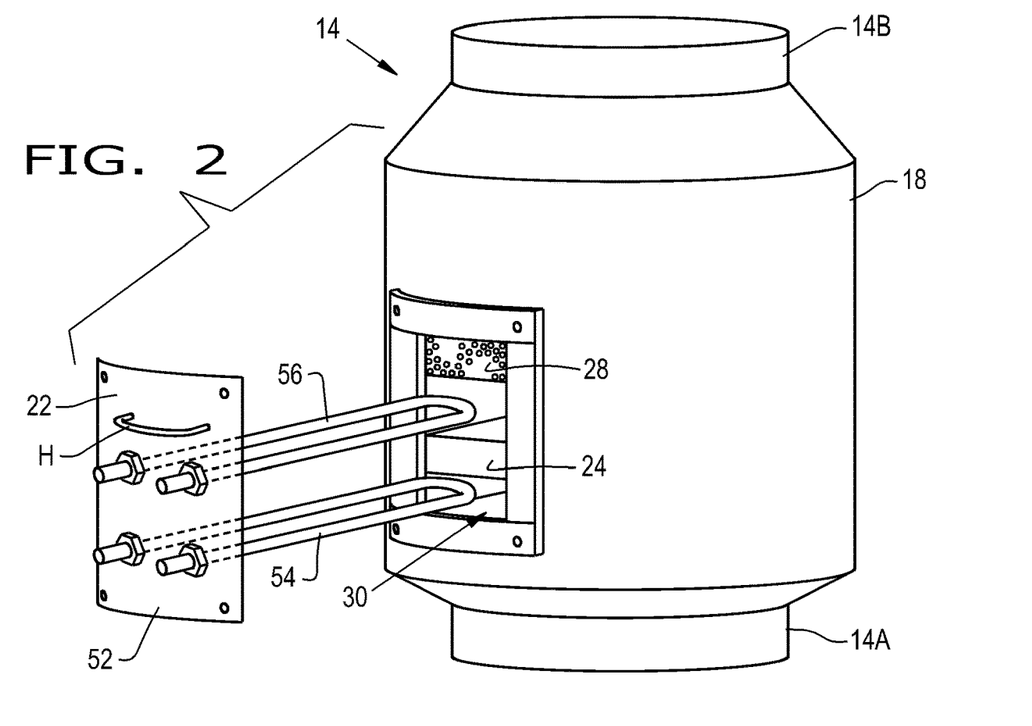
FIG. 2 is an exploded view of the exhaust gas purifying system.

The heating device 22 is coupled to the housing 18 and heats the hot box 20. More specifically, the heating device respectively heats the first and second chambers 34, 36 of the hot box 20. The heating device may generally include a cover 52 removably connected to the housing 18 by way of fasteners (not shown), a first heating element 54, and a second heating element 56 (FIG. 2). The cover 52 may include a handle H for allowing an operator to easily grasp and move the heating device 22. The first and second heating elements 54, 56 are respectively connected to the cover 52 and enclosed by the first and second chambers 34, 36 (FIG.

7). The heating elements 54, 56 may respectively heat the chambers 34, 36 to be at the same or different temperatures. For example, the first heating element 54 may heat the first chamber 34 to be at approximately 200-600° F., and the second heating element 56 may heat the second chamber 36 to be at approximately 400-1100° F. The heating elements 54, 56 may be in the form of any desired coil heaters. It should be appreciated that the heating device 22 may additionally include an external cover which substantially covers and shields the cover 52 and heating elements 54, 56. The external cover may be in the form of any desired external cover, such as an external metal box, which removably connects to the housing 18 via one or more fasteners. The external cover for the heating device 22 may also include a sealing material, e.g. a silicone sealing material, to weather-seal the cover 52 and heating elements 54, 56.

The rotating filter 24 is rotatably mounted to and housed within the housing 18. The rotating filter 24 can be a reticulated filter which is composed of a metal foam. For example, the rotating filter 24 may be composed of a stainless-steel foam. The rotating filter 24 can clean pollutants, such as various particulate matter and organic or inorganic materials, out of the exhaust gas. In more detail, the portion of the rotating filter 24 which is not within the hot box 20 can capture pollutants within the exhaust gas of the cooking process. The rotating filter 24 has a rotational cycle in which at least a portion of the rotating filter 24 passes through the hot box 20. After a complete revolution of the rotating filter 24, the entirety of the rotating filter 24 passes through and is cleaned by the hot box 20. The rotating filter 24 may complete one full revolution within a range of 6-20 minutes, for example, one full revolution may be completed in approximately 8 minutes, plus or minus two minutes. Since the first chamber 34 of the hot box 20 is used to heat the bottom of the rotating filter 24 as it passes therethrough, the pollutants can be cooked off of the rotating filter 24. It is also possible that the pollutants from the rotating filter 24 may fall onto the bottom wall 42 of the first chamber 34. Thereby, the rotating filter 24 can be self-cleaned by the hot box 20. The rotating filter can be in the form of a circular filter which has a diameter that is slightly smaller than the inner diameter of the housing 18. One advantage of the self-cleaning feature of the rotating filter 24 is that the rotating filter 24 may not need to be replaced or it at least may not need to be replaced as often. It should be appreciated that the rotating filter 24 may be in the form of any desired, commercially available filter, such as the stainless-steel filter #RQ-7400A manufactured by SELEE® Corporation.

The rotating filter 24 may be moveably mounted to the housing 18 by an axle 58 and/or ball bearings 60 connected to the housing 18. For example, the rotating filter 24 may be secured and rotate relative to a fixed axle 58, which is fixedly attached to the second chamber 36 of the hot box 20 (FIGS. 8D-8E). In this regard, the rotating filter 24 may have a corresponding hole associated with the fixed axle 58. Additionally or alternatively, for example, the rotating filter 24 may be supported by and rotate relative to the ball bearings 60 positioned beneath and/or above the rotating filter 24. The ball bearings 60 can be spaced circumferentially around the inside perimeter of the housing 18. As shown in FIGS. 4-6, there may be a set of lower and upper ball bearings 60 for allowing the rotating filter 24 to rotate relative thereto. In this regard, the rotating filter 24 can be vertically fixed by the ball bearings 60, but can rotate freely about the fixed axle 58.

Figure 9A:
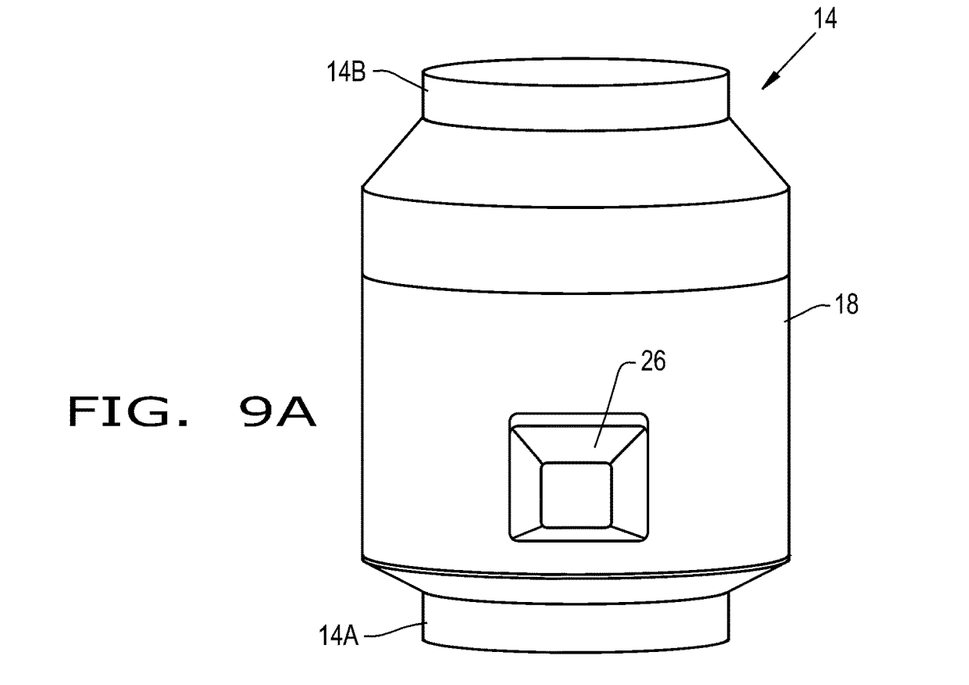
FIG. 9A-9B are side perspective views of the exhaust gas purifying system illustrating the drive.
Figure 9B:
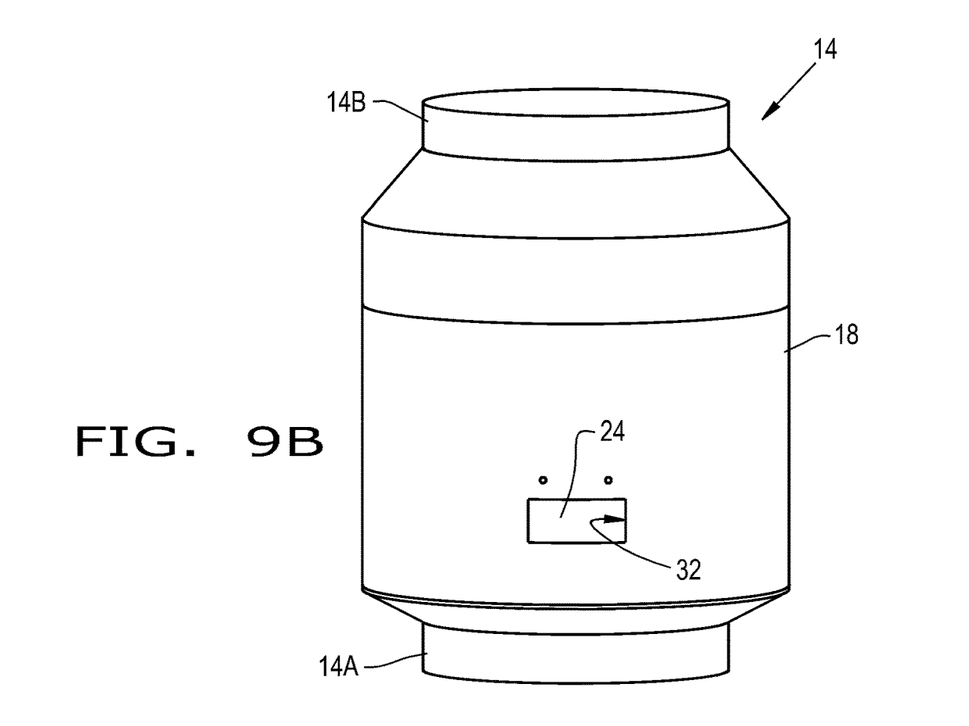

Referring now to FIGS. 9A-9B, there is shown the drive 26 which is operably coupled to and rotates the rotating filter 24. The drive 26 may include a driving wheel which at least partially extends through the cutout 32 and contacts the rotating filter 24. Additionally, the drive 26 may include a biasing member, such as a spring, to forcibly engage the driving wheel with the rotating filter 24. The drive is connected to the outside of the housing 18 by one or more fasteners. The drive 26 may be in the form of any desired commercially available electric drive, such as an electric motor. It should be appreciated that the drive 26 may include an external cover which houses and shields the drive 26. The external cover for the drive 26 may be in the form of any desired cover, e.g. a metal box which removably connects to the housing 18 via one or more fasteners. The external cover for the drive 26 may also include a sealing material, e.g. a silicone sealing material, to weather-seal the drive 26.

Figure 10:
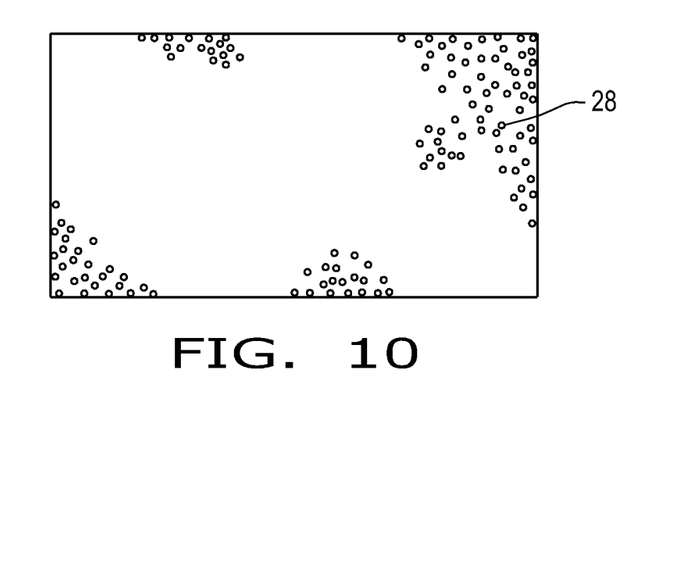
FIG. 10 is a top view of the stationary filter of the exhaust gas purifying system.

Referring now to FIG. 10, there is shown the stationary filter 28. The stationary filter 28 can be positioned in the hot box 20 and may have a shape, e.g. rectangular, which corresponds to the shape of the hot box 20. In more detail, the stationary filter 28 may be positioned inside the second chamber 36 and rest on the ledges 48 of the second chamber 36. The stationary filter 28 can be in the form of a reticulated ceramic filter 28, e.g. a ceramic combustor, which cleans the exhaust gas passing through the hot box 20. The reticulated ceramic filter 28 may act as a catalytic converter when it is heated to a desired temperature, for example between 400-1100° F., and thereby the reticulated ceramic filter 28 may clean the exhaust gas through a catalytic process. Throughout the operational life of the exhaust gas purifier 14, the stationary filter 28 may be easily serviced and/or replaced with a new stationary filter 28 by an individual. It should be appreciated that the stationary filter 28 may be in the form of any desired, commercially available filter, such as the reticulated ceramic filter #HH040715 manufactured by SELEE® Corporation.

Figure 11:
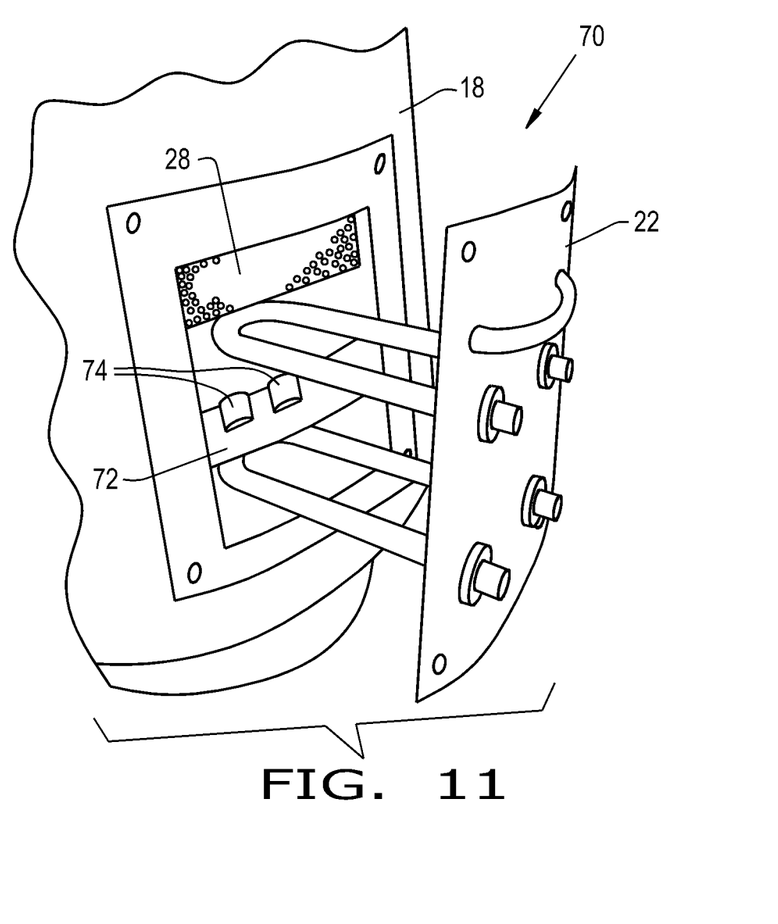
FIG. 11 is an exploded view illustrating another embodiment of an exhaust gas purifying system according to the present invention.

Referring now to FIG. 11, there is shown another embodiment of an exhaust gas purifying system that includes an exhaust gas purifier 70. The exhaust gas purifier 70 may be substantially the same as the exhaust gas purifier 14 as discussed above, except that the exhaust gas purifier 70 includes a toothed rotating filter 72 and a corresponding drive (not shown). The toothed rotating filter 72 may be operably connected to the housing 18 as the rotating filter 24 discussed above. The toothed rotating filter 72 includes teeth 74, e.g. grooves, around its perimeter which correspond and respectively couple to one or more gear(s) of the drive. The drive may rotate its gear(s) in order to rotate the toothed rotating filter 72.

Figure 12:
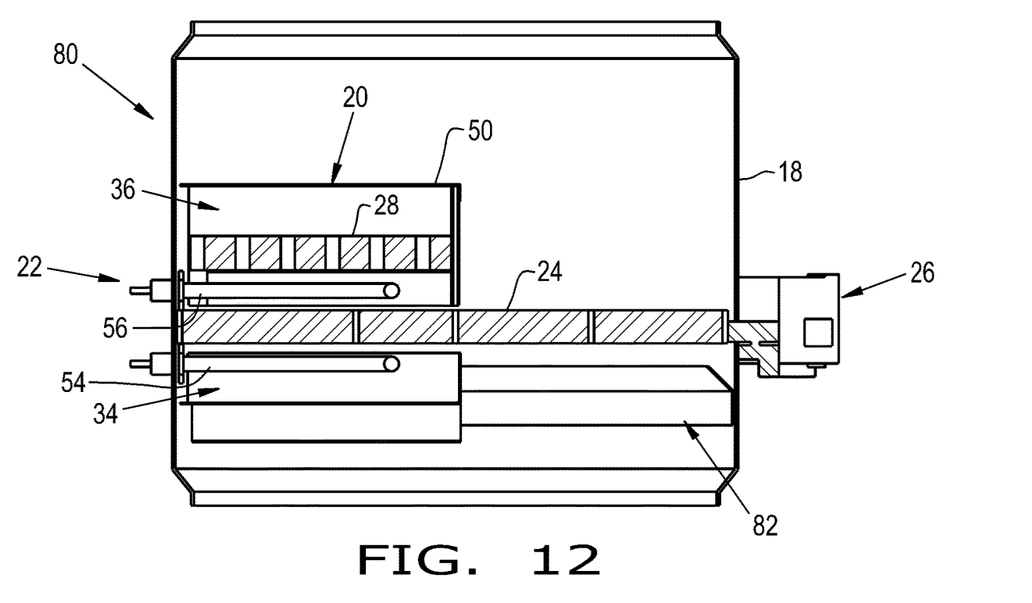
FIG. 12 illustrates another embodiment of the exhaust gas purifying system which includes an air diverter.
Figure 13:
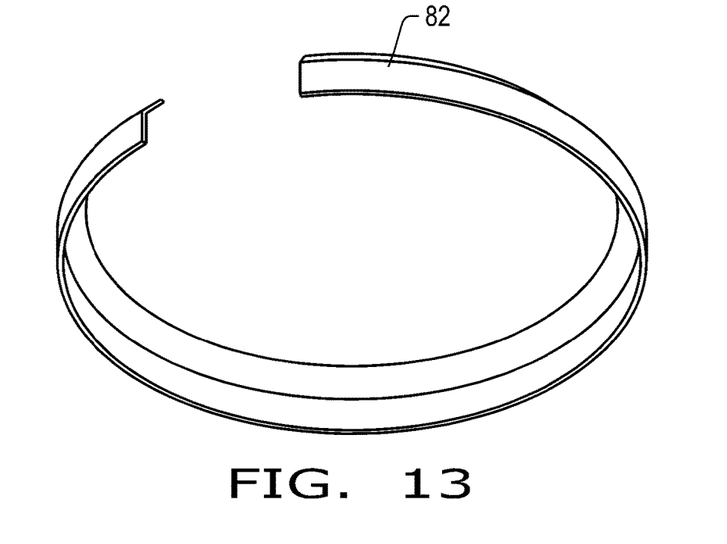
FIG. 13 is a perspective view of the air diverter as shown in FIG. 12.

Referring now to FIGS. 12-13, there is shown another embodiment of an exhaust gas purifying system that includes an exhaust gas purifier 80 and one or more air diverter(s) 82 positioned within the exhaust gas purifier 80. The exhaust gas purifier 80 may be substantially similar to either exhaust gas purifier 14, 70 as discussed above, and thereby, the same reference characters have been used to identify the same or like components. The air diverter(s) 82 may be coupled to the inside wall of the housing 18, underneath the rotating filter 24, and may extend outwardly therefrom. The air diverter(s) 82 divert the airflow of the exhaust gas away from the inside wall such that substantially all of the exhaust gas passes through the rotating filter 24. In more detail, since the diameter of the rotating filter 24 is slightly smaller than the inner diameter of the housing 18, a space or gap may exist therebetween, and the air diverter(s) 82 may thereby cover the gap in order to keep any exhaust gas from passing through the gap in between the rotating filter 24 and the inside wall of the housing 18. As shown, the exhaust gas purifier 80 includes a single air diverter 82 that is monolithically formed and covers the aforementioned gap from one side of the hot box 20, around the inside perimeter of the housing 18, to the other side of the hot box 20. In an alternative embodiment, the air diverter 82 may be in the form of multiple air diverters 82, which partially or fully the cover the aforementioned gap. The air diverter(s) 82 may be in the form of any desired material, such as sheet metal that is bent to desired specifications.

Figure 14:
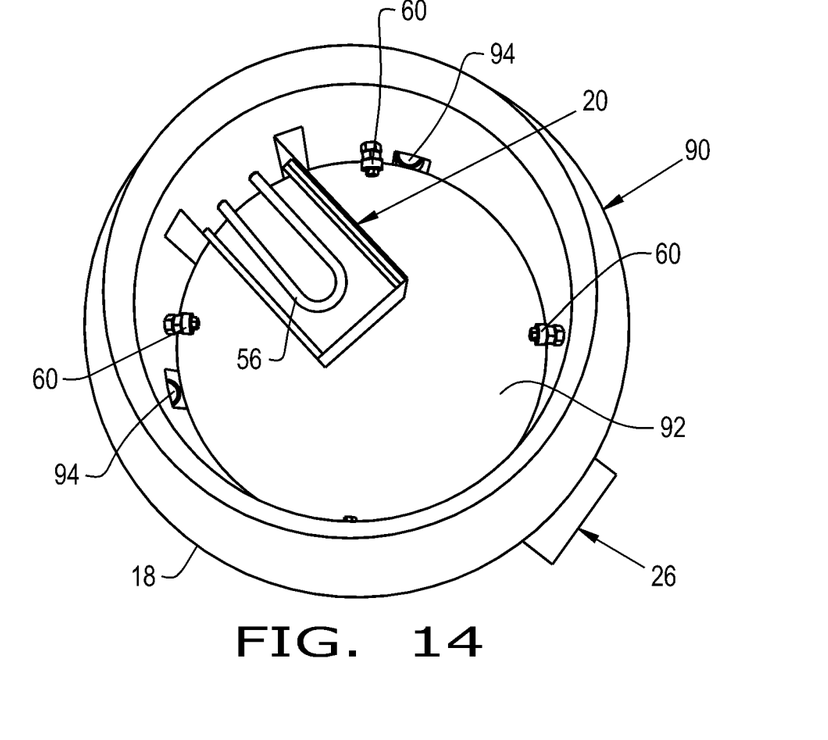
FIG. 14 is a top perspective view of another embodiment of the exhaust gas purifying system which includes guide members.
Figure 15:
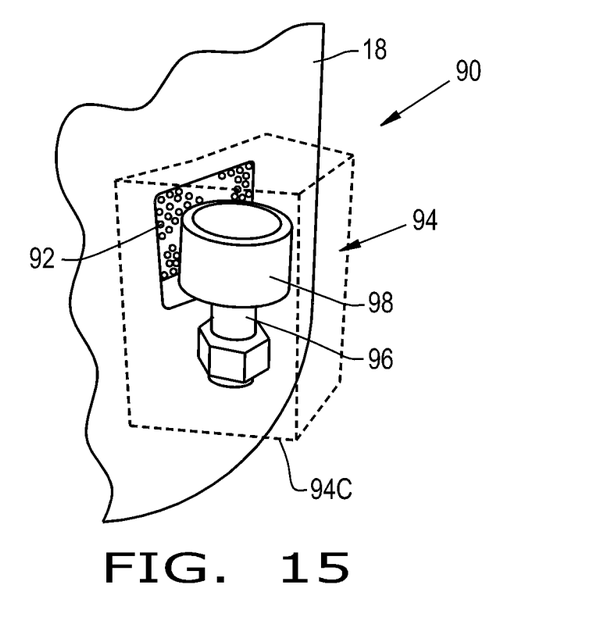
FIG. 15 is a perspective view illustrating a guide member as shown in FIG. 14.

Referring now to FIGS. 14-15, there is shown another embodiment of an exhaust gas purifying system which generally includes an exhaust gas purifier 90. The exhaust gas purifier 90 may be substantially similar to the exhaust gas purifiers 14, 70, 80 as discussed above, except that the exhaust gas purifier 90 includes a rotating filter 92, without a center-fixed axle 58, and accompanying guide members 94 that guide the rotating filter 92 as it rotates within the housing 18. The same reference characters have been used to identify the same or like components. Each guide member 94 helps to maintain the position of the rotating filter 92 relative to the inside wall of the housing 18. The housing 18 of the exhaust gas purifier 90 may include a respective cutout (unnumbered) which accommodates the guide members 94. It should be appreciated that the exhaust gas purifier 90 may also include the air diverter(s) 82 as discussed above.

Each guide member 94 generally includes a stationary member 96 that mounts to the housing 18, a rotating member 98, and a guide member cover 94C which covers the guide members 94 (FIG. 15). The stationary member 96 may be in the form of an elongated stem which couples to the outside of the housing 18 and/or to the inside of the guide member covers 94C. The rotating member 98 may be in the form of a guide wheel 98 that is rotatably connected to the stationary member 96, and which follows, i.e., rotates with the rotating filter 92. The rotating member 98 at least partially extends through the housing 18 and directly contacts the outer perimeter of the rotating filter 92. As shown in FIG. 14, the exhaust gas purifier 90 may include at least two guide members 94 disposed at desired intervals around the perimeter of the rotating filter 92. However, the exhaust gas purifier 90 may include three, four, or more guide members 94 in order to stabilize the rotating filter 92 and maintain its position relative to the inside of the housing 18. It should be appreciated that the guide member covers 94C may be in the form of any desired covers, such as a metal box, that is removably coupled to the housing 18 via one or more fasteners. The guide member covers 94C may also include a sealing material, e.g. a silicone sealing material, to weather-seal the guide members 94.

In operation, the exhaust gas purifiers 14, 70, 80, 90 filter the exhaust gas and self-clean the rotating filter 24, 72, 92. For simplicity of description, the operation of the exhaust gas purifiers 14, 70, 80, 90 will be discussed with respect to the exhaust gas purifier 14 only. As exhaust gas exits the exhaust vent 12 of the restaurant, the exhaust flows first into the inlet 18A of the housing 18. The exhaust gas then flows upwardly through the portion of the rotating filter 24 which is not presently covered by the lower chamber 34 of the hot box 20. The rotating filter 24 captures pollutants, such as various particulates and organic matters, from the exhaust gas. After passing through the rotating filter 24, the filtered exhaust gas may be drawn through the power vent 16 and released to the ambient air. The self-cleaning feature of the exhaust gas purifier 14 is accomplished by the hot box 20 and the heating device 22. The first heating element 54 heats the first chamber 34 of the hot box 20 such that the air within the first chamber 34 heats the rotating filter 24 and melts off the pollutants, e.g. the organic materials, which were captured by the rotating filter 24. Thereby, as the rotating filter 24 rotates throughout its rotational cycle, the rotating filter 24 is continually cleaned. The airstream exiting from the first chamber 34, through the portion of the rotating filter 24 within the hot box 20, and into the second chamber 36 is reheated by the second element 56 and is filtered by the stationary filter 28 in a catalytic process. After passing through the stationary filter 28, the airstream exits the second chamber 36 through the top cover 50 and is drawn through the power vent 16 and released to the ambient air.

Figure 16:
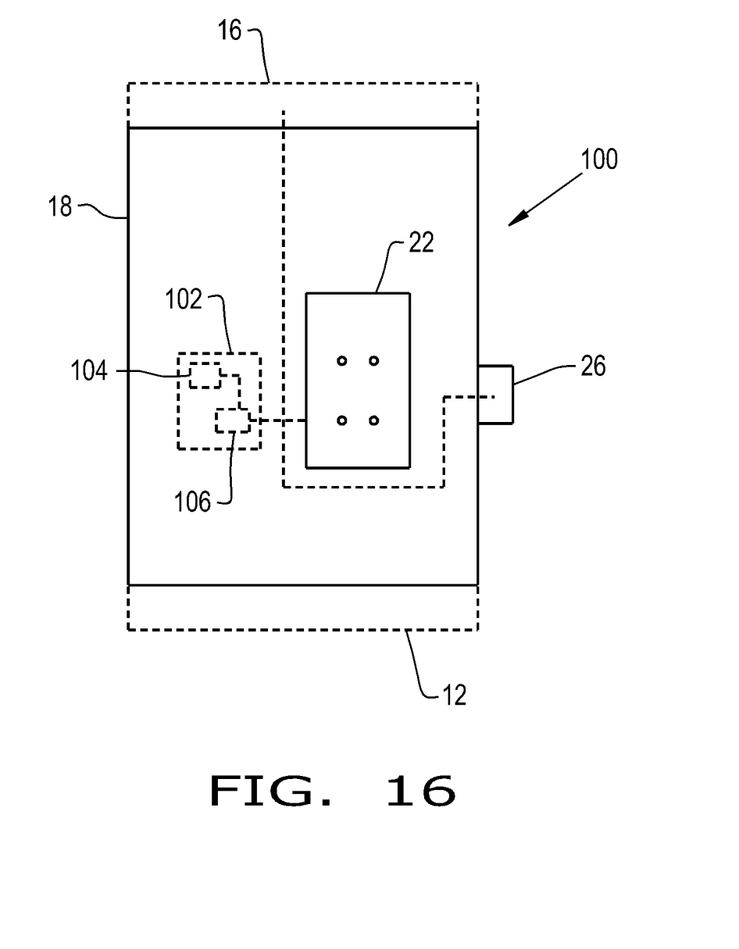
FIG. 16 is a schematic representation of another embodiment of the exhaust gas purifying system which further includes an indication system.

Referring now to FIG. 16, there is shown a schematic representation of another embodiment of an exhaust gas purifying system which generally includes an exhaust gas purifier 100 in the form of one of the exhaust gas purifiers 14, 70, 80, 90 as discussed above, an exhaust vent 12, a power vent 16, and an indication system 102 coupled to the exhaust gas purifier 100. The indication system 102 is configured to detect an inoperative condition of the exhaust gas purifier 100, shutoff the exhaust gas purifier 100, and notify an operator that the exhaust gas purifier 100 is not properly functioning as desired. The indication system 102 may be electrically coupled to each of the power vent 16, the heating device 22, and the drive 26. An inoperative condition as described herein may refer to a condition in which the rotating filter 24, 72, 92 has become clogged such that it is no longer desirably filtering the exhaust gas, or a condition in which the power vent 16, the heating device 22, and/or drive 26 is no longer functioning as desired. The indication system 102 generally includes one or more sensor(s) 104 and a control device 106 configured to shutoff the exhaust gas purifier 100. The indication system 102 may also include an indicator (not shown) which notifies an operator of the condition of the exhaust gas purifier 100.

The sensor(s) 104 may be coupled to the housing 18, for example, attached to an inner wall of the housing 18. The sensor(s) 104 may be in the form of temperature and/or pressure sensor(s) 104 which sense the temperature or pressure within the exhaust gas purifier 100. As shown, the exhaust gas purifier 100 includes a single temperature sensor 104 which senses a temperature within the housing 18. For example, the temperature sensor 104 may be in the form of a thermocouple 104. The sensor 104 may detect a temperature at a location within the housing 18 that is above the rotating filter 24, 72, 92. Additionally, there may be multiple temperature sensors 104 that are positioned within the housing 18 at locations beneath and above the rotating filter 24, 72, 92 in order to measure the temperature drop, e.g. the change in temperature, of the exhaust gas before and after passing through the rotating filter 24, 72, 92.

The control device 106 may be in the form of a mechanical and/or electrical control device. In the present embodiment, the control device 106 is in the form of a control module 106, such as a mechanical switch, which receives one or more signal(s) from the sensor(s) 104. In the present embodiment, the mechanical switch 106 is configured to automatically shut off the heating device 22, the drive 26, and/or the power vent 16 when the sensor 104 detects a certain threshold temperature within the housing 18 which is below or above a preset temperature or temperature range. For instance, if the rotating filter 24, 72, 92 becomes substantially clogged, then the temperature within the housing 18 above the rotating filter 24, 72, 92 will be significantly lower than the temperature beneath the rotating filter 24, 72, 92, e.g. within the lower hot box 34, and thereby the sensor 104 may register a temperature which is beneath a preset temperature at which the mechanical switch 106 will automatedly turn off the exhaust gas purifier 100. By way of example, the mechanical switch 106 may shut off the exhaust gas purifier 100 if the sensor 104 detects a temperature that is 100° F. different than the desired operating temperature of the space below the rotating filter 24, 72, 92. Alternatively, it is conceivable for the control device 106 to be an electrical control device, such as an electronic control unit (ECU) or processor, which has been preprogrammed to turn off the exhaust gas purifier 100 upon the sensor 104 detecting a threshold temperature and/or pressure.

The indicator (not shown) may be in the form of an indicator light or an indicator signal that can be communicated to service personnel or an operator. For example, the indicator may be in the form of a wireless indicator signal, which is sent by the control device 106, in order to notify the operator that the exhaust gas purifier 100 is no longer operating. It should also be appreciated that an individual may be notified of the inoperative condition of the exhaust gas purifier 100 due to the fact that the exhaust gas may no longer be flowing out of the exhaust system, e.g. out through the exhaust pipe 12, since the power vent 16 is no longer actively moving the exhaust gas through the exhaust gas purifier 100.

While this invention has been described with respect to an embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A restaurant exhaust gas purifying system for filtering an exhaust gas of a cooking process, comprising:
    an exhaust vent; and
    an exhaust gas purifier coupled to the exhaust vent and including:
        a housing having an inlet connected to the exhaust vent and an outlet;
        a hot box connected to and housed within the housing;
        a heating device connected to the housing and configured for heating the hot box;
        a rotating filter rotatably mounted to and housed within the housing and having a rotational cycle in which at least a portion of the rotating filter passes through the hot box;
        a drive connected to the housing and operably coupled to the rotating filter for rotating the rotating filter; and
        a stationary filter positioned in the hot box, wherein said hot box includes a first chamber configured for heating and self-cleaning said portion of said rotating filter, and a second chamber positioned above the first chamber that houses said stationary filter and is configured for heating said stationary filter.

2. The restaurant exhaust gas purifying system of claim 1, wherein said rotating filter is positioned in between and separates said first chamber from said second chamber.

3. The restaurant exhaust gas purifying system of claim 1, wherein said heating device includes a cover removably connected to the housing, a first heating element connected to the cover and enclosed by the first chamber, and a second heating element connected to the cover and enclosed by the second chamber.

4. The restaurant exhaust gas purifying system of claim 1, wherein after a complete revolution of said rotating filter an entirety of said rotating filter passes through and is cleaned by said hot box.

5. The restaurant exhaust gas purifying system of claim 1, wherein said housing is in the form of a cylindrical housing and said rotating filter is in the form of a circular filter.

6. The restaurant exhaust gas purifying system of claim 5, further including a plurality of ball bearings connected to the housing, spaced circumferentially around an inside perimeter of said housing, and each said ball bearing contacting said rotating filter such that said rotating filter is supported by and rotates relative to said plurality of ball bearings.

7. The restaurant exhaust gas purifying system of claim 1, wherein said stationary filter is in the form of a reticulated ceramic filter.

8. The restaurant exhaust gas purifying system of claim 1, wherein said rotating filter is in the form of a reticulated metal foam filter.

9. An exhaust gas purifier for filtering out an exhaust gas, comprising:
    a housing having an inlet and an outlet;
    a hot box connected to and housed within the housing;
    a heating device connected to the housing and configured for heating the hot box;
    a rotating filter rotatably mounted to and housed within the housing and having a rotational cycle in which at least a portion of the rotating filter passes through the hot box;
    a drive connected to the housing and operably coupled to the rotating filter for rotating the rotating filter; and
    a stationary filter positioned in the hot box, wherein said hot box includes a first chamber configured for heating and self-cleaning said portion of said rotating filter, and a second chamber positioned above the first chamber that houses said stationary filter and is configured for heating said stationary filter.

10. The exhaust gas purifier of claim 9, wherein said rotating filter is positioned in between and separates said first chamber from said second chamber.

11. The exhaust gas purifier of claim 9, wherein said heating device includes a cover removably connected to the housing, a first heating element connected to the cover and enclosed by the first chamber, and a second heating element connected to the cover and enclosed by the second chamber.

12. The exhaust gas purifier of claim 9, wherein after a complete revolution of said rotating filter an entirety of said rotating filter passes through and is cleaned by said hot box.

13. The exhaust gas purifier of claim 9, wherein said housing is in the form of a cylindrical housing and said rotating filter is in the form of a circular filter.

14. The exhaust gas purifier of claim 13, further including a plurality of ball bearings connected to the housing, spaced circumferentially around an inside perimeter of said housing, and each said ball bearing contacting said rotating filter such that said rotating filter is supported by and rotates relative to said plurality of ball bearings.

15. The exhaust gas purifier of claim 9, wherein said stationary filter is in the form of a reticulated ceramic filter.

16. The exhaust gas purifier of claim 9, wherein said rotating filter is in the form of a reticulated metal foam filter.

17. A method for cleaning an exhaust gas from an exhaust vent of a cooking process, comprising the sequential steps of:
    providing an exhaust gas purifier including a housing having an inlet and an outlet, a hot box connected to and housed within the housing, the hot box including a first chamber and a second chamber positioned above the first chamber, a heating device connected to the housing and configured for heating the hot box, a rotating filter rotatably mounted to and housed within the housing and having a rotational cycle in which at least a portion of the rotating filter passes through the hot box, a drive connected to the housing and operably coupled to the rotating filter for rotating the rotating filter, and a stationary filter positioned in the second chamber of the hot box, and wherein said first chamber is configured for heating and self-cleaning said portion of said rotating filter and said second chamber houses said stationary filter and is configured for heating said stationary filter;

heating, by said heating device, said first chamber and said second chamber;

receiving, by said inlet, the exhaust gas stream from the exhaust vent;

rotating said rotating filter by said drive;

filtering the exhaust gas stream through said rotating filter for cleaning the exhaust gas stream by capturing a plurality of pollutants out of the exhaust gas in said rotating filter;

receiving, by said outlet, the cleaned exhaust gas stream exiting said rotating filter and releasing the cleaned exhaust gas stream to an ambient air;

self-cleaning said rotating filter, by said first chamber, heating said portion of said rotating filter as it passes through said first chamber, such that said plurality of pollutants are removed from said rotating filter and accordingly enter an airstream passing through said first chamber;

receiving, by said second chamber, said airstream exiting said first chamber;

catalytically cleaning said airstream, by filtering said airstream through said stationary filter, such that said plurality of pollutants within said airstream are removed from said airstream by said stationary filter; and receiving, by said outlet, said airstream exiting said second chamber and releasing said airstream to the ambient air.

18. The method of claim 17, wherein said stationary filter is in the form of a reticulated ceramic filter, and said rotating filter is in the form of a reticulated metal foam filter.

* * * * *